(12) United States Patent
Van Eesbeek et al.

(10) Patent No.: US 12,276,492 B2
(45) Date of Patent: Apr. 15, 2025

(54) DEVICE AND METHOD FOR ESTIMATING A LOAD IN A BEARING HAVING HIGH FREQUENT OSCILLATIONS

(71) Applicant: Aktiebolaget SKF, Gothenburg (SE)

(72) Inventors: Stijn Van Eesbeek, Doorn (NL); Elizabertus Maljaars, Houten (NL); Johannes Ravesloot, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 164 days.

(21) Appl. No.: 17/957,082

(22) Filed: Sep. 30, 2022

(65) Prior Publication Data
US 2023/0116813 A1 Apr. 13, 2023

(30) Foreign Application Priority Data
Oct. 12, 2021 (DE) .......................... 102021211493.8

(51) Int. Cl.
*G01B 11/16* (2006.01)
*G01L 1/18* (2006.01)

(52) U.S. Cl.
CPC .............. *G01B 11/16* (2013.01); *G01L 1/18* (2013.01)

(58) Field of Classification Search
CPC .... G01L 5/0009; G01L 5/0019; G01M 13/04; G01B 7/18
See application file for complete search history.

(56) References Cited

U.S. PATENT DOCUMENTS

| | | | | |
|---|---|---|---|---|
| 5,471,880 A * | 12/1995 | Lang | ...................... | G01H 1/006 |
| | | | | 702/56 |
| 6,711,952 B2 * | 3/2004 | Leamy | .................. | F16C 19/527 |
| | | | | 73/659 |
| 7,389,701 B2 * | 6/2008 | Mol | ...................... | G01L 5/0009 |
| | | | | 73/862.322 |
| 7,444,888 B2 * | 11/2008 | Mol | ...................... | F16C 19/522 |
| | | | | 73/862.322 |
| 7,599,804 B2 * | 10/2009 | Pecher | ................ | G01M 13/045 |
| | | | | 702/56 |
| 7,606,673 B2 * | 10/2009 | Judd | ....................... | G01H 13/00 |
| | | | | 702/56 |
| 7,640,139 B2 * | 12/2009 | Sahara | ................... | G01H 1/003 |
| | | | | 702/56 |

(Continued)

*Primary Examiner* — Tran M. Tran
(74) *Attorney, Agent, or Firm* — GARCIA-ZAMOR INTELLECTUAL PROPERTY LAW, LLC; Ruy Garcia-Zamor

(57) ABSTRACT

Disclosed is a device for estimating a load in a bearing, including a receiving unit for receiving a sensor signal waveform. The sensor signal waveform is provided by at least one sensor probe arranged at the bearing. The at least one sensor probe is configured to measure a displacement and/or strain of the bearing. The sensor signal waveform is a product of a carrier waveform and a load waveform, and an electronic control unit configured for processing the received measured sensor signal waveform, by determining a rolling element frequency from the measured sensor signal waveform, determining the carrier waveform based on the determined rolling element frequency and the measured sensor signal waveform, determining the load waveform based on determined carrier waveform and the measured sensor signal waveform, and estimating the load in the bearing from the determined load waveform.

12 Claims, 3 Drawing Sheets

(56) References Cited

U.S. PATENT DOCUMENTS

| | | | |
|---|---|---|---|
| 7,650,254 B2 * | 1/2010 | Pecher | F16C 19/522 |
| | | | 702/42 |
| 7,716,018 B2 * | 5/2010 | Pecher | G01P 3/443 |
| | | | 702/190 |
| 9,038,468 B2 * | 5/2015 | Heim | G01M 13/045 |
| | | | 73/660 |
| 9,182,316 B2 * | 11/2015 | Cocconcelli | G01M 13/04 |
| 9,442,026 B2 * | 9/2016 | Mol | F16C 41/00 |
| 9,574,965 B2 * | 2/2017 | Furman | G01B 21/16 |
| 9,588,015 B2 * | 3/2017 | Sako | G01M 13/045 |
| 9,618,037 B2 * | 4/2017 | Kar | G01M 13/045 |
| 9,989,439 B2 * | 6/2018 | Thomson | G01M 13/045 |
| 10,018,524 B2 * | 7/2018 | Mol | G01L 1/12 |
| 10,094,790 B2 * | 10/2018 | Hammerschmid | |
| | | | G01N 23/20016 |
| 10,281,438 B2 * | 5/2019 | Girondin | G01N 29/4463 |
| 10,520,397 B2 * | 12/2019 | Gao | G01M 99/008 |
| 10,648,874 B1 * | 5/2020 | Shiba | G01D 5/245 |
| 10,677,685 B2 * | 6/2020 | Thomson | G05B 23/0283 |
| 10,697,855 B2 * | 6/2020 | Roepke | G01M 13/045 |
| 10,908,048 B2 * | 2/2021 | Loverich | G01M 13/00 |
| 10,914,656 B2 * | 2/2021 | Thomson | G01H 1/003 |
| 10,969,303 B2 * | 4/2021 | Sepe | F16C 19/527 |
| 11,002,635 B2 * | 5/2021 | Hubert | G01M 13/045 |
| 11,085,489 B2 * | 8/2021 | Epps | G01L 5/0019 |
| 11,112,336 B2 * | 9/2021 | Li | G01M 99/005 |
| 11,280,699 B2 * | 3/2022 | Zhou | G01M 13/045 |
| 11,453,239 B2 * | 9/2022 | Bertola | G01L 5/0019 |
| 11,493,405 B2 * | 11/2022 | Bergstrom | G01H 1/003 |
| 11,519,821 B2 * | 12/2022 | Qiao | F03D 17/00 |
| 11,543,326 B2 * | 1/2023 | Cheng | G01H 17/00 |
| 11,698,287 B2 * | 7/2023 | Ciciriello | G01H 11/06 |
| | | | 73/660 |
| 11,731,455 B2 * | 8/2023 | Bertola | F16C 33/586 |
| | | | 384/448 |
| 2006/0235628 A1 * | 10/2006 | Pecher | G01M 1/22 |
| | | | 702/41 |
| 2013/0096848 A1 * | 4/2013 | Hatch | G01M 13/045 |
| | | | 702/39 |
| 2013/0211742 A1 * | 8/2013 | Mol | G01L 1/06 |
| | | | 702/43 |
| 2015/0165705 A1 * | 6/2015 | Mawby | G01M 17/02 |
| | | | 702/84 |
| 2015/0260590 A1 * | 9/2015 | Hatakeyama | G01M 13/04 |
| | | | 384/448 |
| 2015/0369698 A1 * | 12/2015 | Sakaguchi | G01M 13/04 |
| | | | 702/56 |
| 2016/0187226 A1 * | 6/2016 | Tsutsui | G01M 13/045 |
| | | | 73/593 |
| 2018/0017604 A1 * | 1/2018 | Daw | G01R 23/167 |
| 2018/0038413 A1 * | 2/2018 | Aizawa | F16C 19/527 |
| 2019/0301975 A1 * | 10/2019 | Sugiura | F16C 35/12 |
| 2021/0010883 A1 | 1/2021 | Lang et al. | |
| 2021/0379718 A1 * | 12/2021 | Van Sprang | G05B 19/4065 |
| 2022/0050017 A1 * | 2/2022 | Saarinen | G01M 13/045 |
| 2023/0175929 A1 * | 6/2023 | Baliva | G01L 5/0019 |
| 2023/0358569 A1 * | 11/2023 | Tamatsukuri | G01N 29/46 |
| 2024/0210277 A1 * | 6/2024 | Van Eesbeek | G01M 13/045 |
| 2024/0344930 A1 * | 10/2024 | Maljaars | G01M 13/04 |

* cited by examiner

DEVICE AND METHOD FOR ESTIMATING A LOAD IN A BEARING HAVING HIGH FREQUENT OSCILLATIONS

CROSS-REFERENCE TO RELATED APPLICATIONS

This application claims priority to German Patent Application no. 102021211493.8, filed Oct. 12, 2021, the contents of which is fully incorporated herein by reference.

TECHNICAL FIELD OF THE INVENTION

The present invention relates to a device for estimating a load in a bearing. Further, the present invention relates to a bearing assembly and a method for estimating a load in a bearing.

BACKGROUND OF THE INVENTION

In order to sense bearing loads, it is known to determine the rolling element load from a strain signal at a sensor location for each rolling element passing by the sensor, and then reconstruct the bearing load from the rolling element load. The strain signal depends on several factors such as the size and direction of the rolling element load, the shape and/or material properties of the rolling elements and/or the bearing ring, as well as the location and orientation of the area where the sensor is located with respect to the rolling element load vectors. Due to the rolling elements passing the sensor periodically, the measured strain signal is the result of the load acting on the bearing, wherein the load is modulated with a carrier signal corresponding to the periodic motion of the rolling elements.

Moreover, known methods and algorithms used for load sensing on bearings are limited in bandwidth of the load they can measure, i.e., high frequent oscillations of load cannot be measured and/or distort measured load variations occurring at low frequencies. More particularly, an upper limit for estimating bearing loads is typically less than a quarter of the rolling element frequency.

In many applications of interest, for example applications having regular high frequent load variations, such as pumps, compressors, and gear drive trains, loads can occur that have frequencies spreading over a broad frequency band. In case that frequency bands arise around and/or close to the carrier signal frequencies, the frequency bands can start to overlap with the carrier signal bands when the frequencies of the load acting on the bearing become too high. Because of this overlapping, extracting the loads acting on the bearing directly from the raw frequency data may become complicated.

In order to improve the design and analysis of rolling element bearings and their surroundings in application that include broadband load frequencies, a capability of estimating broadband load frequencies is needed.

It is therefore object of the present invention to estimate bearings loads having high frequent oscillations.

SUMMARY OF THE INVENTION

In the following a device for estimating a load in a bearing is provided. The device comprises a receiving unit for receiving a sensor signal waveform, wherein the sensor signal waveform is provided by at least one sensor probe arranged at the bearing, wherein the at least one sensor probe is configured to measure a displacement and/or strain of the bearing. For example, the load waveform may be defined by at least one load frequency having an associated amplitude and a phase.

Preferably, the at least one sensor probe may be configured to measure a displacement and/or deformation of the bearing related to a local rolling element force acting on the bearing. For example, the at least one sensor probe may be a strain gauge, a fiber optic-based strain gauge, a piezo-resistive sensing element, an eddy current sensor measuring a displacement or any other sensor gauge capable of sensing a displacement and/or deformation of the bearing. Furthermore, a plurality of sensor probes may be arranged at the bearing.

In addition, the device comprises an electronic control unit configured for processing the received measured sensor signal waveform. Furthermore, the device may include a transmitting unit configured to transmit the sensor signal from the at least one sensor probe to the electronic control unit. In particular, the measured sensor signal may be transmitted to the electronic control unit via at least one cable and/or wireless.

The electronic control unit is configured to determine a rolling element frequency from the measured senor signal waveform. Further, the electronic control unit is also configured to determine the carrier waveform based on the determined rolling element frequency and the measured sensor signal waveform. For example, determining the carrier waveform may comprise parameterizing the carrier waveform. The electronic control unit is also configured to determine the load waveform based on the determined carrier waveform and the measured sensor signal waveform and to estimate the load in the bearing from the determined load waveform. In particular, the electronic control unit may be configured to determine the carrier waveform and the load waveform simultaneously. Alternatively, the carrier waveform and the load waveform may be determined sequentially.

Moreover, the electronic control unit may also be configured to recalibrate the load waveform into a suitable unit of measurement such as the metric system. Determining both the load waveform and the carrier waveform allows to separate the load waveform from the carrier waveform which may allow to shift the limiting frequency for estimating bearing loads to the rolling element frequency or even above. In other words, bearing loads having frequencies up to the rolling element frequency or even above can determined and evaluated. This allows for an estimation and evaluation of loads having a broad range of frequencies.

The term "rolling element frequency" refers to the frequency with which any rolling element passes the at least one sensor probe. Furthermore, it is assumed that the rolling element frequency is essentially constant for the duration of the load estimation in the bearing, wherein "essentially constant rolling element frequency" means that a rolling element speed deviation is less than 5%, and that the shape of the carrier waveform stays essentially the same when loads and/or loaded zone shapes vary.

Furthermore, the term "strain" refers to a local deformation of the material, more particularly a deformation of the material at the location of the sensor, wherein the strain is defined as $e=\Delta L/L$, wherein $\Delta L$ is a change in length of a piece of material and L is the original length of the piece of material.

The term "load" refers to a force with which the rolling elements act on the bearing, more particularly a ring of the bearing. Depending on the location of the sensor probe, it may be necessary to reconstruct the bearing loads from the measured rolling element loads. For example, US 2021/ 0010883 A1 describes a method how at least one bearing load can be reconstructed from at least one measured rolling element load.

According to a further embodiment, estimating the load in the bearing comprises estimating time dependent load values for providing a curve illustrating a load evolution in time. This allows for a more precise assessment of a load acting on the bearing.

Preferably, the sensor signal waveform is provided in the time domain, and wherein the determining of the rolling element frequency, the carrier waveform and/or the load waveform is performed in frequency domain. This allows for a determination of the frequency spectrum of the carrier waveform and/or the load waveform.

Also, determining the rolling element frequency may include transforming the measured sensor signal waveform from the time domain into the frequency domain, preferably by using a fast Fourier transformation. Transforming the measured sensor signal to the frequency domain allows for a simple and efficient determination of the rolling element frequency.

According to a further preferred embodiment, determining the carrier waveform comprises parameterizing the carrier waveform up to a predetermined harmonic of the rolling element frequency $f_{re}$ in the frequency domain, wherein preferably each harmonic is parameterized by a phase and an amplitude. For example, when considering three harmonics of the carrier waveform, the carrier waveform can be expressed as follows:

$$c(t)=a1\ \sin(2\pi f_{re}+b1)+a2\ \sin(2\cdot 2\pi f_{re}+b2)+a3\ \sin(4\cdot 2\pi f_{re}+b3)$$

wherein the carrier waveform is parameterized by two parameters, namely the amplitude a1, a2, a3 and the phase b1, b2, b3, for each harmonic of the rolling element frequency $f_{re}$. Parameterizing the carrier waveform has the further advantage that it allows for a more precise determination of the carrier waveform which further allows to improve the determination the load waveform.

Furthermore, the load waveform is preferably parameterized using a predetermined number of parameters in the frequency domain, wherein, preferably for a plurality of frequencies, the load waveform is parameterized by a phase and an amplitude corresponding to each frequency. For example, for each frequency of interest, two parameters, namely amplitude and phase, may be used. This advantageously allows for a more precise determination of the load waveform as the full spectrum of the load waveform can be determined. More particularly, the electronic control unit may be configured to determine the load waveform and the carrier waveform sequentially or simultaneously.

Preferably, the electronic control unit is further configured to determine a calculated sensor signal waveform by multiplying the determined carrier waveform and the determined load waveform. This allows to compare the measured sensor signal to the calculated sensor signal and to determine the accuracy of the determination.

According to a further preferred embodiment, the electronic control unit is further configured to transform the measured sensor signal into the frequency domain and to determine an error criterion, wherein the error criterion is a difference between the measured sensor signal and the calculated sensor signal in the frequency domain.

Preferably, the electronic control unit is configured to improve the estimation of the load by optimizing determined carrier waveform and/or the determined load waveform by minimizing the error criterion. For example, the electronic control unit may be configured to adjust the parameters of the determined load waveform and/or the determined carrier waveform to minimize the error criterion. The smaller the error criterion is, the closer is the calculated sensor signal to the measured sensor signal. Thus, determining the error criterion advantageously allows to improve the determination of the load waveform and consequently the estimation of the load in the bearing.

According to a further aspect, a bearing assembly is provided, which comprises a bearing having a first ring equipped with at least one sensor probe, wherein the at least one sensor probe is configured to measure a displacement and/or strain of the bearing, a second ring, and a row of rolling elements arranged between the first ring and the second ring, and a device for estimating at least one bearing load frequency in a bearing as previously mentioned.

According to another aspect, a method for estimating a load in a bearing is provided, wherein the bearing comprises a first ring, a second ring and a row of rolling elements arranged between the first ring and the second ring. The method comprises the steps of:

equipping the first ring with at least one sensor probe, wherein the at least one sensor probe is configured to measure a displacement and/or strain of the bearing, measuring a sensor signal waveform using the at least one sensor probe, wherein the sensor signal waveform is a product of a carrier waveform and a load waveform, transmitting the measured sensor signal waveform from the at least one sensor probe to an electronic control unit, determining a rolling element frequency from the measured sensor signal waveform, determining the carrier waveform based on the determined rolling element frequency and the measured sensor signal waveform, determining the load waveform based on the determined carrier waveform and the measured sensor signal waveform, and estimating the load in the bearing from the determined load waveform.

The embodiments described or shown in relation with the device may also apply to the method and/or the bearing assembly without departing from the scope of protection.

An even further aspect of the present invention relates to a computer program product comprising a computer program code which is adapted to prompt a control unit, e.g., a computer, and/or a computer of the above discussed manufacturing arrangement to perform the above discussed steps.

The computer program product may be a provided as memory device, such as a memory card, USB stick, CD-ROM, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. In the following, preferred embodiments of the invention are described in relation to the drawings, wherein the drawings are exemplarily only, and are not intended to limit the scope of protection. The scope of protection is defined by the accompanied claims, only.

The figures show.

In the following same or similar functioning elements are indicated with the same reference numerals.

DETAILED DESCRIPTION OF THE INVENTION

Figure 1:
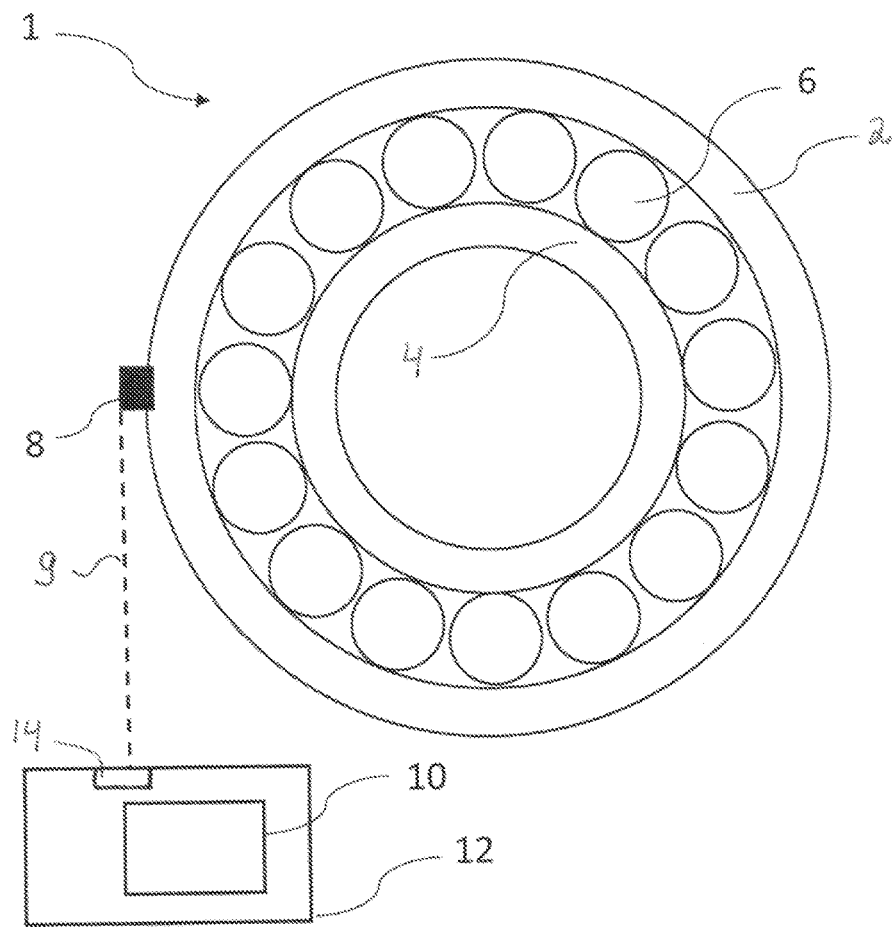
FIG. 1: a schematic illustration of a bearing assembly according to an embodiment.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows a bearing assembly 1 which comprises a first ring 2 equipped with at least one sensor probe 8, a second ring 4, and a row of rolling elements 6 arranged between the first ring 2 and the second ring 4. The sensor probe 8 is configured to measure a displacement and/or deformation of the first ring 2 related to a local rolling element force acting on the bearing. For example, the sensor probe 8 may be a strain gauge, a fiber optic-based strain gauge, a piezo-resistive sensing element, an eddy current sensor or any other 7 sensor gauge capable of sensing a displacement and/or deformation of the bearing. Also, the bearing 1 may be equipped with more than one sensor probe 8.

The sensor probe 8 is connected to a transmitting unit 9 configured to transmit the sensor signal which is measured by the sensor probe 8 to a device 12 for estimating a load in a bearing. In particular, the measured sensor signal may be transmitted to the device 12 via at least one cable and/or wireless.

The device 12 comprises a receiving unit 14 for receiving the sensor signal waveform measured by the sensor probe 8 and an electronic control unit 10 configured to process the received measured sensor signal waveform. More particularly, the receiving unit 14, and the electronic unit 10 may be integral and/or may be separate units.

Figure 2:
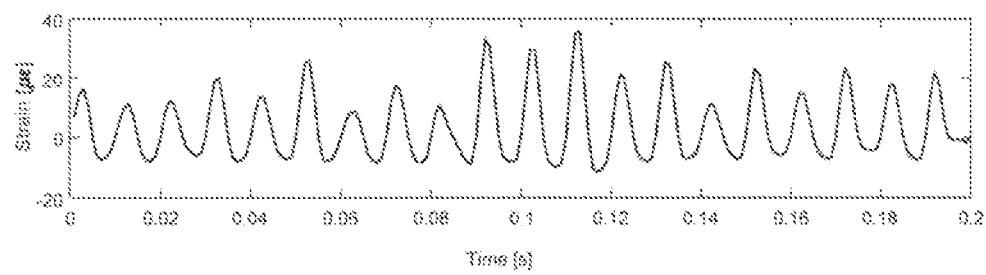
FIG. 2: a graph illustrating a measured strain signal waveform.

FIG. 2 shows a graph illustrating a measured strain signal waveform, wherein the x-axis represents the time, and the y-axis represents the measured strain. The time dependent strain signal waveform is a product of a carrier waveform and a load waveform, and can be represented in the time domain as follows:

$$e(t) = F(t) \cdot c(t)$$

wherein $e(t)$ is the measured strain waveform, $F(t)$ is the load waveform, and $c(t)$ is the carrier waveform.

The electronic control unit 10 is configured to determine a rolling element frequency from the measured strain signal waveform by transforming the measured strain signal waveform into the frequency domain, preferably by using a fast Fourier transformation.

Figure 3:
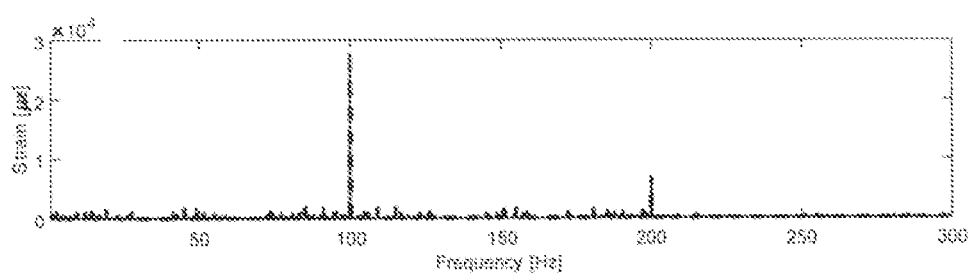
FIG. 3: a graph illustrating both a frequency spectrum of the measured strain signal and a frequency spectrum of a determined strain signal.

The solid line in FIG. 3 shows a frequency spectrum of the measured strain signal waveform obtained after transforming the measured strain signal waveform of FIG. 2 into the frequency domain using the fast Fourier transformation. In FIG. 3, the x axis represents the frequency, and the y axis represents the strain.

The electronic control unit 10 is then configured the determine the rolling element frequency from the Fourier transformed strain signal, and to determined based on the determined rolling element frequency and the measured strain signal waveform, the carrier waveform $c(t)$ in the frequency domain.

To determine the carrier waveform, the electronic control unit is configured to parameterize the carrier waveform up to a predetermined harmonic of the rolling element frequency $f_{re}$ up to a predetermined harmonic of the rolling element frequency in the frequency domain, wherein preferably each harmonic is parameterized by a phase and an amplitude. For example, when considering three harmonics of the carrier waveform in the time domain, the carrier waveform can be expressed as follows:

$$c(t) = a1 \sin(2\pi f_{re} + b1) + a2 \sin(2 \cdot 2\pi f_{re} + b2) + a3 \sin(4 \cdot 2\pi f_{re} + b3)$$

wherein the carrier waveform $c(t)$ is parameterized by two parameters, namely the amplitude a1, a2, a3 and the phase b1, b2, b3, for each harmonic of the rolling element frequency $f_{re}$.

Furthermore, the electronic control unit 10 is also configured to determine the load waveform based on the determined and parameterized carrier waveform and the measured strain signal by parameterizing the load waveform using a predetermined number of parameters in the frequency domain. More particularly, the load wave form is parameterized for a plurality of frequencies by a phase and an amplitude corresponding to each frequency. The determination of the carrier waveform and the load waveform can be performed sequentially or simultaneously.

For example, for each frequency of interest, two parameters, namely amplitude and phase, may be used. More particularly, since the electronic control unit 10 has parameterized both the carrier waveform and the load waveform, the electronic control unit 10 is able to calculate a determined sensor signal, for example in the case of a strain sensor probe, a determined strain signal. This allows to compare the measured strain signal waveform to the determined strain signal waveform, and to determine the accuracy of the determination. The dashed line in FIG. 3 shows the estimated strain signal waveform in the frequency spectrum.

Figure 4:
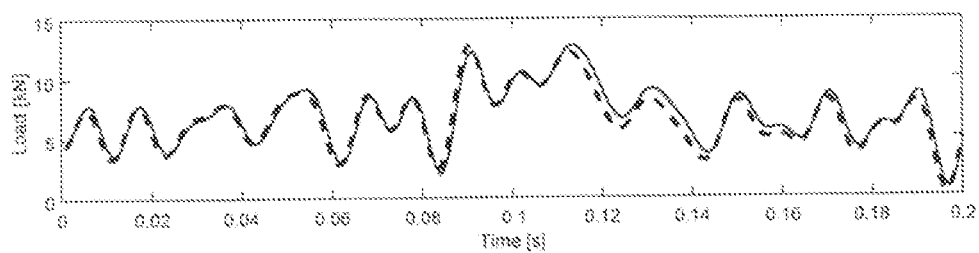
FIG. 4: a graph illustrating a measured load and an estimated load.

FIG. 4 shows a graph illustrating a comparison between the load waveform extracted from the measured strain signal shown in FIG. 2 and the determined load waveform, wherein the x-axis represents the time, and the y axis represents the load. More specifically, the electronic control unit 10 may be further configured to transform the measured strain signal into the frequency domain and to determine an error criterion, wherein the error criterion is defined as a difference between the measured strain signal and the determined strain signal in the frequency domain. Moreover, the electronic control unit 10 may be further configured to improve the estimation of the load by optimizing determined carrier waveform and/or the determined load waveform by minimizing the error criterion. For example, the electronic control unit 10 may be configured to adjust the parameters of the determined load waveform and/or the determined carrier waveform to minimize the error criterion.

Figure 5:
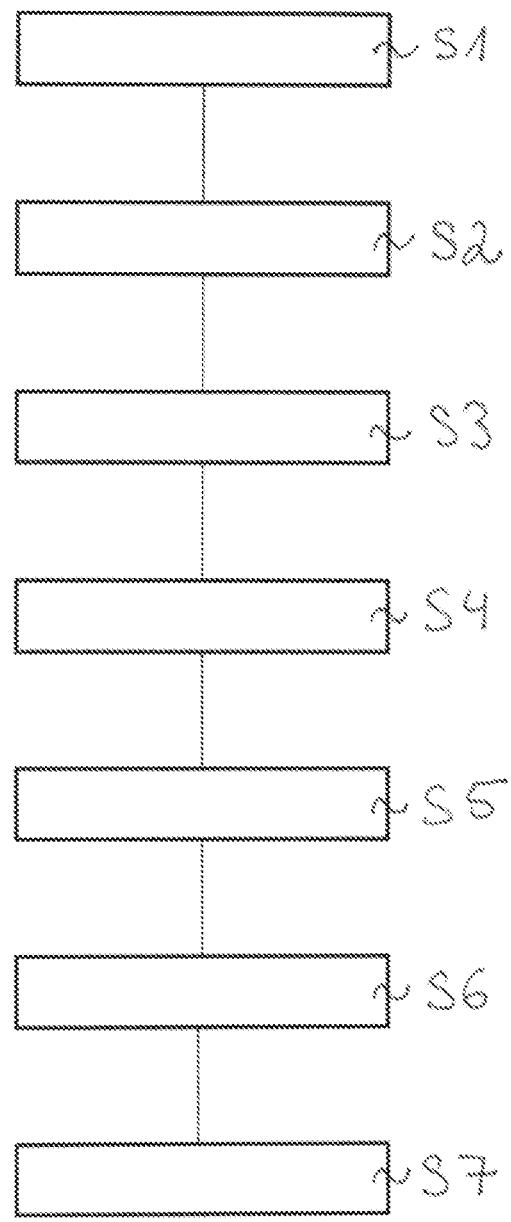
FIG. 5: a flow chart illustrating a method for estimating a load in a bearing according to an embodiment.

FIG. 5 shows a flow chart which schematically illustrates a method for estimating a load in a bearing 1 comprising a first ring 2, a second ring 4 and a row of rolling elements arranged between the first ring 2 and the second ring 4. The method comprises as a first step equipping the first ring 2 with at least one sensor probe 8. In a second step S2, a sensor signal waveform is measured using the at least one sensor probe, wherein the sensor signal waveform is a product of a carrier waveform and a load waveform.

After measuring the sensor signal waveform, the measured sensor signal waveform is transmitted in a third step S3 from the at least one sensor probe 8 to the electronic control unit 10 which determines in a fourth step S4 a rolling element frequency from the measured sensor signal waveform.

In a fifth step S5, the carrier waveform is determined based on the determined rolling element frequency and the measured sensor signal, and in a sixth step S6 the load waveform is determined based on the determined carrier waveform, which is determined in S5, and the sensor signal measured in S2. Preferably, the steps S5 and S6 are performed simultaneously. However, it is also possible to perform the steps S5 and S6 sequentially. Finally, the electronic control unit 10 then estimates in step S7 the load in the bearing from the determined load waveform.

In summary, determining the carrier waveform as well as load waveform allows to shift the load frequency estimations above the rolling element frequency, while preceding methods were typically limited at around a quarter of the rolling element frequency. Thus, the loads having fast variations can be quantified, which typically occur in many types of equipment such as pumps, compressors, and marine screws.

The invention claimed is:

1. A device for estimating a load in a bearing, the bearing comprising a first ring, a second ring, and a row of rolling elements arranged between the first ring and the second ring, the device comprising:
   at least one sensor probe attached directly to the first ring without a sensor holder, the at least one sensor probe being configured to measure a displacement and/or strain of the bearing, the displacement and/or strain of the bearing being measured as a sensor signal waveform, the sensor signal waveform being a product of a carrier waveform and a load waveform,
   a transmitting unit that transmits the sensor signal waveform from the at least one sensor probe to a receiving unit,
   the receiving unit configured to receive the sensor signal waveform from the transmitting unit, and
   an electronic control unit connected integrally to the receiving unit and configured for processing the received measured sensor signal waveform, by
      a rolling element frequency determined from the measured sensor signal waveform,
      the carrier waveform determined based on the determined rolling element frequency and the measured sensor signal waveform,
      the load waveform determined based on determined carrier waveform and the measured sensor signal waveform, and
      the load in the bearing estimated from the determined load waveform.

2. The device according to claim 1, wherein estimating the load in the bearing comprises estimating time dependent load values for providing a curve illustrating a load evolution in time.

3. The device according to claim 1, wherein the sensor signal waveform is provided in the time domain, and wherein the determining of the rolling element frequency, the carrier waveform and/or the load waveform is performed in frequency domain.

4. The device according to claim 1, wherein determining the rolling element frequency includes transforming the measured sensor signal waveform from the time domain into the frequency domain.

5. The device according to claim 1, wherein determining the carrier waveform comprises parameterizing the carrier waveform up to a predetermined harmonic of the rolling element frequency in the frequency domain, wherein preferably each harmonic is parameterized by a phase and an amplitude.

6. The device according to claim 1, wherein determining the load waveform comprises parameterizing the load waveform using a predetermined number of parameters in the frequency domain, wherein preferably for a plurality of frequencies the load waveform is parameterized by a phase and an amplitude corresponding to each frequency.

7. The device according to claim 1, wherein the electronic control unit is further configured to determine a calculated sensor signal waveform by multiplying the determined carrier waveform and the determined load waveform.

8. The device according to claim 7, wherein the electronic control unit is further configured to transform the measured sensor signal waveform into the frequency domain and to determine an error criterion, wherein the error criterion is a difference between the measured sensor signal waveform and the calculated sensor signal waveform in the frequency domain.

9. The device according to claim 8, wherein the electronic control unit is further configured to improve the estimation of the load by optimizing the determined carrier waveform and/or the determined load waveform by minimizing the error criterion.

10. A bearing assembly comprising:
    a bearing having a first ring equipped with at least one sensor probe attached directly to the first ring without a sensor holder, the at least one sensor probe configured to measure a displacement and/or strain of the bearing, a second ring, and a row of rolling elements arranged between the first ring and the second ring, and a device for estimating a load in the bearing that provides a receiving unit for receiving a sensor signal waveform, the sensor signal waveform including at least one sensor probe arranged at the bearing, the sensor signal waveform is a product of a carrier waveform and a load waveform, and an electronic control unit configured for processing the received measured sensor signal waveform, by a rolling element frequency determined from the measured sensor signal waveform, the carrier waveform determined based on the determined rolling element frequency and the measured sensor signal waveform, the load waveform determined based on determined carrier waveform and the measured sensor signal waveform, and the load in the bearing estimated from the determined load waveform.

11. A method for estimating a load in a bearing comprising:
providing a first ring, a second ring and a row of rolling elements arranged between the first ring and the second ring,
equipping the first ring with at least one sensor probe attached directly to the first ring without a sensor holder, wherein the at least one sensor probe is configured to measure a displacement and/or strain of the bearing, measuring a sensor signal waveform using the at least one sensor probe, wherein the sensor signal waveform is a product of a carrier waveform and a load waveform, transmitting the measured sensor signal waveform from the at least one sensor probe to an electronic control unit,
determining a rolling element frequency from the measured sensor signal waveform;
determining the carrier waveform based on the determined rolling element frequency and the measured sensor signal waveform, and determining the load waveform based on the determined carrier waveform and the measured sensor signal waveform, and
estimating the load in the bearing from the determined load waveform.

12. The method according to claim 4, wherein the transformation is done using a fast Fourier transformation.

* * * * *